March 19, 1963 T. L. MOUNT 3,082,284
CATHODES FOR LIQUID AMMONIA BATTERIES
Filed Oct. 3, 1961
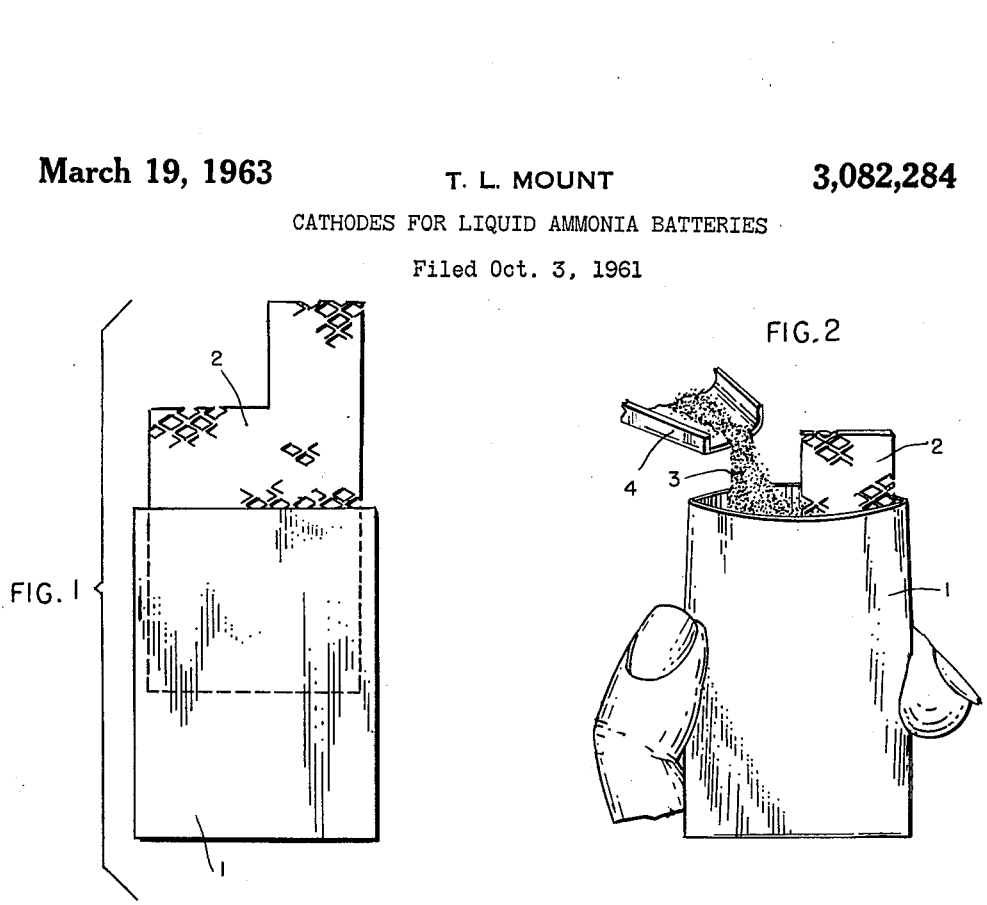
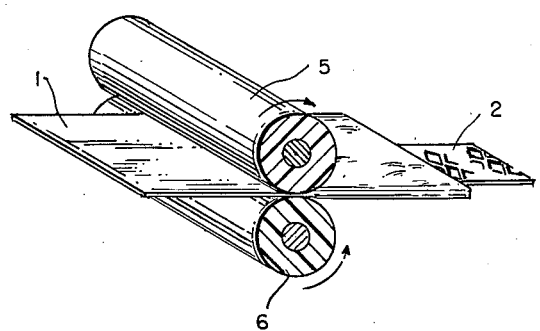
INVENTOR,
THOMAS L. MOUNT
BY *Harry M. Saragovitz*
ATTORNEY.

3,082,284
CATHODES FOR LIQUID AMMONIA BATTERIES
Thomas L. Mount, Bay Head, N.J., assignor to the United States of America as represented by the Secretary of the Army
Filed Oct. 3, 1961, Ser. No. 142,745
7 Claims. (Cl. 136—120)
(Granted under Title 35, U.S. Code (1952), sec. 266)

The invention described herein may be manufactured and used by or for the Government for governmental purposes without the payment of any royalty thereon.

This invention relates to a method of producing depolarizer cathodes for primary cells using an anhydrous ammonia electrolyte. More particularly, the invention relates to high rate discharge primary cells utilizing a solution of an ionizable salt, preferably of neutral character, e.g., potassium thiocyanate in the liquid ammonia electrolyte. Such an electrolyte makes it possible to use magnesium as the anodic material. Cells of this type are described in the copending application O. Adelhart and H. R. Knapp (Serial No. 67,145, filed November 3, 1960), now abandoned; they consist of a thin, flat magnesium anode, a thin, flat cathode comprising a grid pasted with the cathodic material and a plastic spacer that allows fast penetration of the electrolyte solution. The depolarizing material may consist of heavy metal sulfates such as mercuric sulfate or lead sulfate mixed with inert, electronically conductive materials, e.g., graphite powder and this mixture is then pasted into an expanded metal grid, made of titanium, silver, aluminum, stainless steel, etc.

It has been known to place the pasted cathode in an envelope made of very thin, porous separator material to prevent mechanical flaking of the cathode material from interfering with the electrochemical action of the cell. The separator material may consist of micro porous thermo-plastic resin such as polyvinyl chloride, polyethylene, nylon cloth, cellulosic material such as cellophane or polyvinyl alcohol. Frequently certain types of porous paper as, for instance, "Aldex" paper are used. Generally speaking, any material which is porous, electrically insulating and not subject to attack by the liquid ammonia electrolyte may be used.

To prevent flaking of the cathode material it has also been suggested to add small amounts of a binder, such as polystyrene dissolved in an organic solvent to the mixture to be pasted into the cathode but such binders diminish the porosity of the depolarizer cathode, reduce the capacity of the cell and decrease its high rate discharge capacity.

It has also been known to use as a depolarizer material in anhydrous ammonia batteries a mixture of sulfur and carbon. If no binder is used the amount of such a depolarizer mixture that can be pasted into a grid is relatively small since thicker layers of such a mixture are prone to develop considerable cracking and flaking after drying of the pasted cathode especially if larger amounts of carbon are used in the mixture. The reason for these serious disturbances lies in the fact that carbon powder swells if it is wetted and contracts if it dries and therefore a cake made of wet carbon powder will invariably crack on drying. If a binder is used to prevent cracking and flaking on drying the porosity of the sulfur-carbon mix is greatly reduced which makes it impossible to use such batteries as high rate discharge batteries. The mechanical strength of depolarizer cathodes of considerable thickness consisting of mixtures of sulfur and carbon without a binder is so low that putting such a thick cathode into an envelope brings about only a small if any improvement.

I now have found that the addition of a binder material may be completely avoided and yet large amounts of the sulfur-carbon mix be deposited into the grid without the above-mentioned serious disadvantages if this electrode is manufactured by inserting a predetermined amount of the dry cathode mix, without water or any other liquid and without any binder, into an envelope containing the cathode grid, evenly distributing the mix in the envelope by mechanical operations and pressing the envelope containing the grid and the evenly distributed cathode mix in a press using pressures of about 5–15,000 p.s.i. for about 1 to 5 minutes depending on the desired porosity. The pressing operation may also be carried out at elevated temperatures, for instance, between 100° and 180° F.

I have found that the depolarizer mixture of sulfur and carbon may consist of between 60 to 85% of sulfur and 40 to 15% of carbon. I prefer to use pharmaceutical sulfur which is 99.5% pure or better. Three forms of pharmaceutical sulfur are known, namely, precipitated sulfur known as milk of sulfur, sublimed sulfur, known as flowers of sulfur and washed sulfur. I prefer to use sublimed sulfur since this form of sulfur appears to yield the highest capacity probably because its crystal form is most suited for the electrochemical reactions going on in this cell. The carbon powder to be mixed with the sulfur may consist of the conventionally used carbon black or acetylene black particularly Shawinigan black which is a carbon black of high purity made from acetylene gas by thermal composition at a temperature of above 1500° C. Technical graphite powder of a particle size of about 200 mesh may also be used altho the graphite is denser than acetylene black and therefore will not result in batteries of highest discharge rate. Mixtures of carbon black and graphite, e.g., about 80% carbon black and 20% graphite may also be used.

The invention will be illustrated with the help of a specific example shown in the accompanying drawing, in which FIG. 1 is an elevational view of a partially assembled grid and envelope for the cathode according to the invention;

FIG. 2 shows in perspective view the grid and envelope in final position and the dry cathode mix being poured in; and FIG. 3 shows in perspective view the pressing operation of the assembled cathode.

The envelope 1 consists of conventionally used separator material such as, for instance, Aldex paper and the grid 2 is preferably made of expanded metals such as titanium, nickel, aluminum or stainless steel. As shown in FIG. 2 a predetermined amount of dry mix 3 consisting of a dry mix of sulfur and carbon is poured from a scoop 4 into the envelope 1 while keeping this envelope partly open by pressure exerted upon the vertical edges of the envelope. After a predetermined amount of the dry mix is introduced into the envelope its open end is closed to prevent loss of mix, e.g., by an appropriate glue and the envelope is shaken in horizontal position to distribute the mix evenly on the grid. The assembled electrode is then passed between pressure rolls 5 and 6 (FIG. 3) exerting pressures of about 5,000 to 15,000 p.s.i. depending on the materials used and the desired degree of porosity. The assembled grid may of course also be pressed in a flat press. The pressing operation requires only a short time from about half a minute to about 5 minutes depending on the above-mentioned factors and the pressure exerted. The pressing operation may best be carried out at room temperature but elevated temperatures up to about 150° F. may also be used. It is important to determine for each particular cathode mix the optimum pressure conditions.

The cathode made according to the invention shows extraordinary advantages in various directions. Since neither water nor any other liquid nor any binder are present, the exact predetermined amount of the dry cathode mix can be introduced into the envelope which assures uniform performance of the batteries. The new cathodes can be made rapidly and cheaply in mass-production and they can be made to the exact measurements and weights desired.

It will be obvious to those skilled in the art that many different variations and combinations of the various factors may be carried out within the broad inventive idea defined in the appended claims.

What is claimed is:

1. Method of making a sulfur-carbon depolarizer cathode for battery systems using an anhydrous ammonia electrolyte comprising introducing a metal grid into an envelope made of separator material, introducing a predetermined amount of a dry sulfur-carbon mix into said envelope, equally distributing the carbon mix upon the metal grid by mechanical operations and pressing the assembled cathode at pressures of about 5,000 to 15,000 p.s.i. for about one-half to 5 minutes.

2. Method of making a sulfur-carbon cathode according to claim 1 in which the sulfur-carbon mixture consists of between 60 to 85% of sulfur and 40 to 15% of carbon.

3. Method of making a sulfur-carbon cathode according to claim 1 in which the sulfur-carbon mixture consists of 80% sulfur and 20% carbon.

4. Method of making a sulfur-carbon cathode according to claim 1 in which the assembled cathode is exposed to about 15,000 p.s.i. for 1 minute.

5. Method of making a sulfur-carbon cathode according to claim 1 in which the pressing of the assembled cathode is carried out at temperatures of about 120 to 150° F.

6. Method of making a sulfur-carbon cathode according to claim 1 in which the sulfur-carbon mixture consists of between 60 to 85% of flowers of sulfur and 40 to 15% of acetylene black.

7. Method of making a sulfur-carbon cathode according to claim 1 in which the sulfur-carbon mixture consists of 85% of flowers of sulfur and 15% of Shawinigan black and in which the pressing of the assembled cathode is carried out at about 12,000 p.s.i. for about 2 minutes.

References Cited in the file of this patent

UNITED STATES PATENTS

| | | |
|---|---|---|
| 442,336 | Roberts | Dec. 9, 1890 |
| 2,759,986 | Morehouse | Aug. 21, 1956 |
| 2,996,562 | Myers | Aug. 15, 1961 |

FOREIGN PATENTS

| | | |
|---|---|---|
| 533,127 | Canada | Feb. 11, 1958 |